(12) United States Patent
Mogi et al.

(10) Patent No.: US 8,691,465 B2
(45) Date of Patent: Apr. 8, 2014

(54) FUEL CELL AND METHOD OF OPERATING FUEL CELL

(75) Inventors: Satoshi Mogi, Yamato (JP); Masaaki Shibata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1088 days.

(21) Appl. No.: 11/917,277

(22) PCT Filed: Mar. 5, 2007

(86) PCT No.: PCT/JP2007/054749
§ 371 (c)(1),
(2), (4) Date: Dec. 12, 2007

(87) PCT Pub. No.: WO2007/102612
PCT Pub. Date: Sep. 13, 2007

(65) Prior Publication Data
US 2009/0246564 A1  Oct. 1, 2009

(30) Foreign Application Priority Data
Mar. 6, 2006 (JP) .................................. 2006-059180

(51) Int. Cl.
*H01M 8/24* (2006.01)
*H01M 8/04* (2006.01)

(52) U.S. Cl.
USPC ........................... 429/455; 429/452; 429/512

(58) Field of Classification Search
USPC .................................................. 429/400–535
See application file for complete search history.

(56) References Cited

U.S. PATENT DOCUMENTS

| 6,074,771 A | * | 6/2000 | Cubukcu et al. | ............... 429/434 |
| 6,960,401 B2 | | 11/2005 | Barton et al. | |
| 2003/0022042 A1 | * | 1/2003 | Wells et al. | ..................... 429/23 |
| 2003/0077488 A1 | | 4/2003 | Yamamoto et al. | |
| 2009/0004515 A1 | | 1/2009 | Mogi et al. | |

FOREIGN PATENT DOCUMENTS

| CA | 2 293 898 A1 | | 7/2000 | |
| JP | 2003-157886 A | | 5/2003 | |
| JP | 2004-006183 A | | 1/2004 | |
| JP | 2004-259535 A | | 9/2004 | |
| JP | 2006-260871 | * | 9/2006 | ............. H01M 8/02 |
| WO | 2007/102609 A1 | | 9/2007 | |

OTHER PUBLICATIONS

Suzuki et al. JP 2006-260871. Sep. 28, 2006. English machine translation by JPO.*

\* cited by examiner

*Primary Examiner* — Kenneth Douyette
*Assistant Examiner* — James Lee
(74) *Attorney, Agent, or Firm* — Fitzpatrick, Cella, Harper & Scinto

(57) ABSTRACT

Provided is a fuel cell which has a buffer space provided on a downstream side of a fuel supply space, and in which an output of a most downstream fuel cell unit is less affected by impurity gas stored in the fuel supply space.

11 Claims, 9 Drawing Sheets

TABLE 1

| No | P1 | P2 | V2 | V1+V2 | P1/P2 | V2/(V1+V2) | (0.7V) |
|---|---|---|---|---|---|---|---|
| 1 | 100kPa | 200kPa | 0cc | 0.8cc | 0.5 | 0 | 0.027A |
| 2 | 100kPa | 200kPa | 0.8cc | 1.6cc | 0.5 | 0.5 | 0.097A |
| 3 | 100kPa | 200kPa | 1.6cc | 2.4cc | 0.5 | 0.67 | 0.554A |
| 4 | 100kPa | 200kPa | 0.8cc | 3.2cc | 0.5 | 0.25 | 0.023A |
| 5 | 100kPa | 400kPa | 0.8cc | 3.2cc | 0.25 | 0.25 | 0.054A |
| 6 | 100kPa | 500kPa | 0.8cc | 3.2cc | 0.2 | 0.25 | 0.526A |

FIG. 12

TABLE 2

|  | Purge Interval T Calculated Value (Set Value) | Number of Times of Purge | Hydrogen Gas Discharge Amount |
|---|---|---|---|
| Embodiment 3 (with Buffer Flow Path) | 44 Minutes (30 Minutes) | 4 Times | 40ml |
| Comparative Example (without Buffer Flow Path) | 3.4 Minutes (3 Minutes) | 40 Times | 400ml |

FUEL CELL AND METHOD OF OPERATING FUEL CELL

TECHNICAL FIELD

The present invention relates to a fuel cell having a plurality of fuel cell units wherein fuel supply spaces to which a gaseous fuel is supplied are communicated with each other, and more particularly to a structure for effectively removing impurity gas, such as nitrogen gas, from the fuel supply spaces.

BACKGROUND ART

A fuel cell in which fuel supply spaces each disposed on one side of an electrolyte layer and supplied with a gaseous fuel are connected in series to each other has been put into practical use. Further, a fuel cell in which a plurality of fuel supply spaces are disposed in a cascade system wherein the fuel supply spaces are connected in series such that the number of fuel supply spaces connected in parallel to each other is gradually decreased toward a downstream side has also been put into practical use. By the cascade system, the reduction in flow rate on a downstream side of a gaseous fuel due to consumption of the gaseous fuel through the electrolyte layer can be compensated, and stable supply flow rate of the gaseous fuel in the fuel supply spaces can be secured from the most upstream side to the most downstream side.

An air breathing fuel cell in which a polymer electrolyte membrane is used as an electrolyte layer and one side of the polymer electrolyte membrane is in communication with the atmosphere, and which generates electric power by an electrochemical reaction of a gaseous fuel with the atmospheric oxygen has been put into practical use. Since the polymer electrolyte membrane is not a completely airtight membrane, when the polymer electrolyte membrane is disposed between a fuel supply space and an atmosphere communication space, atmospheric nitrogen will intrude into the fuel supply space from the atmosphere communication space by concentration diffusion. Since the nitrogen that has intruded into the fuel supply space lowers the partial pressure of the gaseous fuel in the fuel supply space to lower the power generation efficiency, it is desirable to purge the impurity gas containing nitrogen in the fuel supply space periodically.

U.S. Pat. No. 6,960,401 discloses a technique of discharging impurity gas by purging.

In a fuel cell disclosed in U.S. Pat. No. 6,960,401, not only the impurity gas but also a considerable amount of hydrogen gas remaining in a fuel supply space on a most downstream side is discharged into the atmosphere. Therefore, devices on which such fuel cell is mounted must be designed on the assumption of the discharge of a fuel gas.

Further, if electric power for maintaining an open/close valve in an open sate is additionally extracted from the fuel cell with so lowered output as to require purging, there may be cases where the operation of the device having the fuel cell mounted thereon does not operate well. Alternatively, the output may be temporarily reduced due to the lowering in fuel pressure during a purge operation.

Moreover, if the output of a fuel cell unit on a most downstream side is reduced by stored impurity gas, the output of the entire fuel cell having a plurality of fuel cell units connected in series will also be reduced due to the affect of the output reduction of the fuel cell unit on the most downstream side. Since the output of fuel cell unit on the most downstream side starts to be reduced in a relatively short period of time accompanying the increase in the partial pressure of the impurity gas, if the output of the entire fuel cell is to be maintained high, purging needs be considerably frequently performed. If purging is frequently performed, the consumption of the gaseous fuel wastefully discharged in the atmosphere increases, and the gaseous fuel in a fuel tank does not last for a long period of time.

DISCLOSURE OF THE INVENTION

The present invention aims at providing a fuel cell in which the output of a fuel cell unit on a most downstream side is less affected by impurity gas stored in a fuel supply space.

Specifically, an object of the present invention is to provide a fuel cell that requires less frequency of purging than the fuel cell disclosed in U.S. Pat. No. 6,960,401.

Furthermore, the present invention aims at providing a dead-ended fuel cell that can be operated without purging at the time of starting power generation.

In a fuel cell of the present invention, a fuel supply space into which a gaseous fuel is supplied is disposed on one surface side of a solid electrolyte layer. A buffer space for storing therein impurity gas that intruded into the fuel supply space is connected to a downstream side of the fuel supply spaces. The buffer space is disposed outside the fuel supply space, and one end of the buffer space is connected to the fuel supply space and the other end is closed.

In another fuel cell of the present invention, as in a serial pattern or cascade pattern which will be described later, a plurality of fuel supply spaces each disposed in one surface side of a solid electrolyte layer and supplied with a gaseous fuel are connected in series. A buffer space for storing therein impurity gas that intruded into the fuel supply space is connected to a downstream side of the fuel supply spaces located on a most downstream side in the fuel supply. The buffer space is disposed outside the fuel supply spaces, and one end of the buffer space is connected to the fuel supply spaces and the other end is closed.

The fuel cell of the present invention utilizes the effect of concentrating impurity gas in the fuel supply space during power generation, and stores the impurity gas in the buffer space at a higher concentration than the concentration at upstream and midstream of the fuel supply space. Since the flow of the gaseous fuel allows the impurity gas to drift downstream of the fuel supply space, a concentration gradient of the impurity gas in which the concentration increases from the upstream side to the downstream side is formed in the fuel supply space. In the buffer space connected to the downstream side of the fuel supply space, the impurity gas is stored at the highest concentration of the concentration gradient.

Thereby, comparing to the fuel cell of U.S. Pat. No. 6,960,401 wherein impurity gas is directly stored in a fuel supply space involved in power generation, the increase of the impurity gas concentration in the fuel supply space can be retarded. The concentration of the impurity gas in the fuel supply space is maintained low corresponding to the diffusion of the impurity gas into the volume of the buffer space, so that the partial pressure of the gaseous fuel is maintained high correspondingly.

Therefore, comparing to the fuel cell of U.S. Pat. No. 6,960,401, power generation output is less affected by the impurity gas stored in the fuel supply space. Since the time until the impurity gas stored in the fuel supply space start affecting power generation output is prolonged, comparing to the fuel cell of U.S. Pat. No. 6,960,401, the frequency of purging can be reduced. If the frequency of purging is low, the amount of wastefully consumed gaseous fuel decreases, and the utilization efficiency of the gaseous fuel is increased to make the fuel in the fuel tank last for a long period of time.

Another fuel cell of the present invention utilizes the effect of concentrating impurity gas in the fuel supply spaces connected in series, and stores the impurity gas in the fuel supply space on the most downstream side at a higher concentration than the concentration in the fuel supply space on the upstream side. Further, in the fuel supply space on the most downstream side, the effect of concentrating the impurity gas in the fuel supply space during power generation is utilized to store the impurity gas in the buffer space at a higher concentration than the concentration at upstream and midstream of the fuel supply space on the most downstream side.

Since the flow of the gaseous fuel allows the impurity gas to drift downstream, a concentration gradient of the impurity gas in which the concentration increases from the upstream side to the downstream side is formed in the fuel supply space on the most downstream side. In the buffer space connected to the downstream side of the fuel supply space on the most downstream side, the impurity gas is stored at the highest concentration of the concentration gradient Thereby, comparing to the fuel cell of U.S. Pat. No. 6,960,401 wherein impurity gas is directly stored in a fuel supply space on a most downstream side, the increase of the impurity gas concentration in the fuel supply space on the most downstream side can be retarded. The concentration of the impurity gas in the fuel supply space on the most downstream side is maintained low corresponding to the diffusion of the impurity gas into the volume of the buffer space, so that the partial pressure of the gaseous fuel is maintained high correspondingly.

Therefore, comparing to the fuel cell of U.S. Pat. No. 6,960,401, the output of the fuel cell unit on the most downstream side is less affected by the impurity gas stored in the fuel supply space. Since the time until the impurity gas stored in the fuel supply space start affecting the output of the fuel cell unit on the most downstream side is prolonged, comparing to the fuel cell of U.S. Pat. No. 6,960,401, the frequency of purging can be reduced.

In the another fuel cell of the present invention, because such a high-concentration impurity gas as to impair the power generation performance of the fuel cell unit of the fuel cell of U.S. Pat. No. 6,960,401 is stored in the buffer space, the amount of the gaseous fuel discharged to the exterior when the buffer space is purged can be small. This, together with the low frequency of purging, reduces the amount of the gaseous fuel consumed wastefully by purging, the utilization efficiency of the gaseous fuel increases to make the fuel in the fuel tank last for a long period of time.

BRIEF DESCRIPTION OF THE DRAWINGS

FIG. 12 is a table for comparing the discharge amounts of hydrogen gas in the presence/absence of buffer space.

BEST MODE FOR CARRYING OUT THE INVENTION

Figure 1:
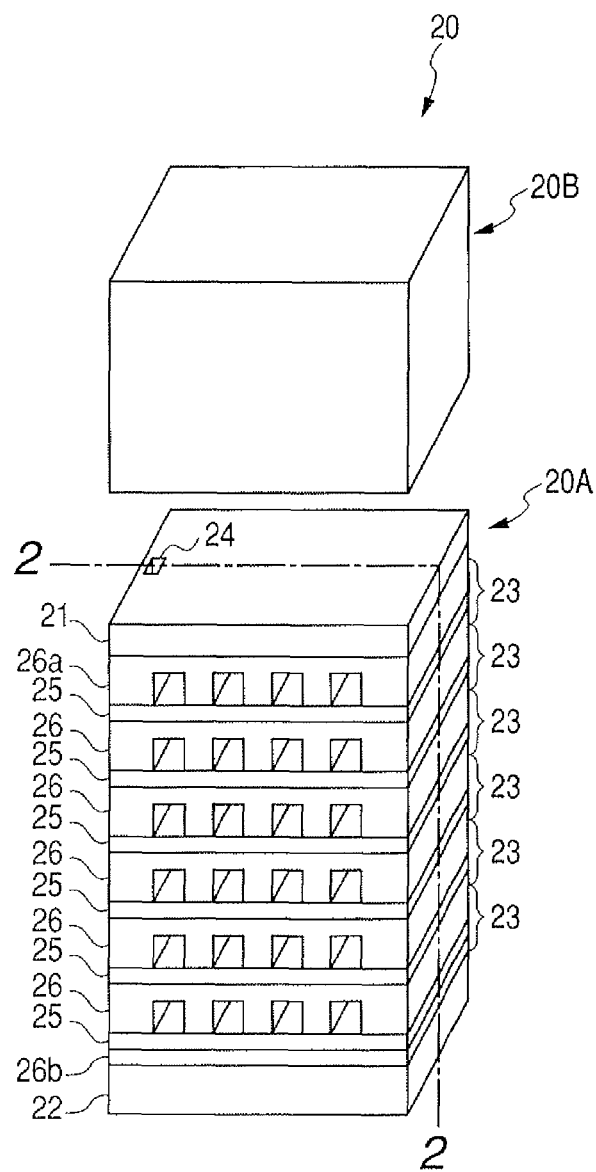
FIG. 1 is a schematic perspective view of a fuel cell according to Embodiment 1 of the present invention.

A fuel cell, which is an embodiment of the fuel cell of the present invention, will be described in detail below referring to the drawings. The fuel cell of the present invention is not limited to the restrictive configuration in each embodiment described below. As long as power generation is carried out by supplying a gaseous fuel to a fuel supply space formed on one surface side of a solid electrolyte layer of a fuel cell unit, the present invention can be realized also by other embodiments wherein a part of or entire configuration in each embodiment is substituted by an alternative configuration.

Although power generation is carried out using hydrogen gas stored in a fuel tank in the following embodiments, a liquid fuel, such as methanol containing hydrogen atoms may be stored in the fuel tank and subjected as needed to a reforming reaction to generate hydrogen gas in a required amount, which may then be supplied to a fuel supply space in a fuel cell unit.

The fuel cells of the embodiments can be implemented as independent fuel cells detachably equipped in portable electronic devices, such as digital cameras, digital camcorders, small projectors, small printers, and notebook personal computers. They can also be implemented in a form in which only a power generating section of the fuel cell is integrally assembled in an electronic device, which is attachable to and detachable from a fuel tank.

EMBODIMENT 1

Figure 2:
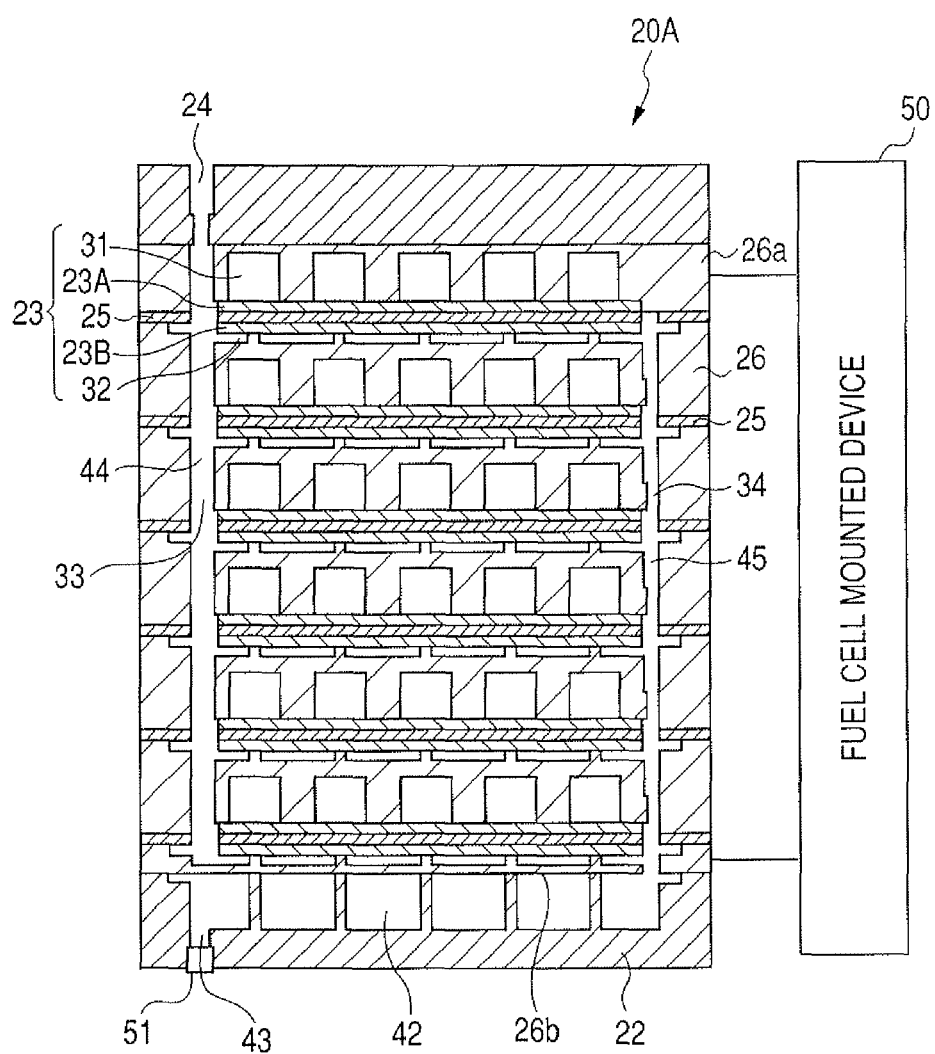
FIG. 2 is a schematic cross-sectional view of a fuel cell stack according to Embodiment 1 of the present invention taken along dashed line 2-2 in FIG. 1.
Figure 3A:
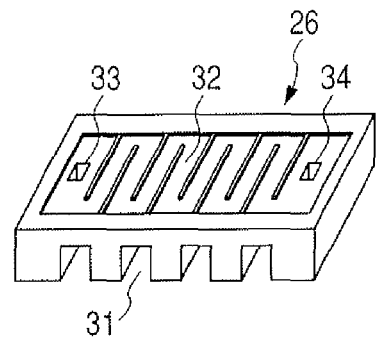
FIGS. 3A, 3B and 3C are schematic perspective views of a separator used in Embodiment 1 of the present invention.
Figure 3B:
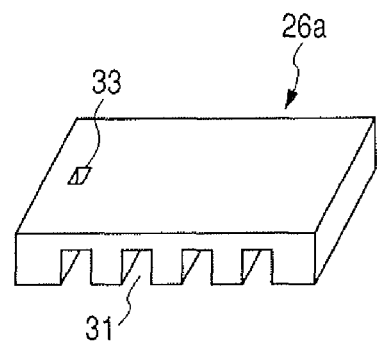
Figure 3C:
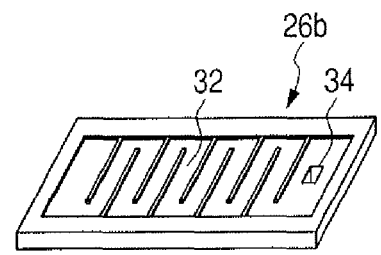
Figure 4:
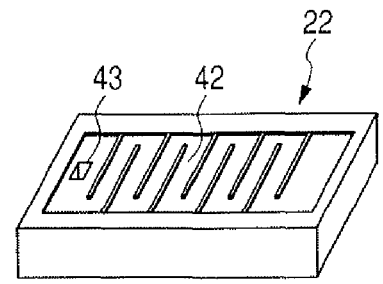
FIG. 4 is a schematic perspective view of a buffer space of Embodiment 1 of the present invention.
Figures 10, 11:
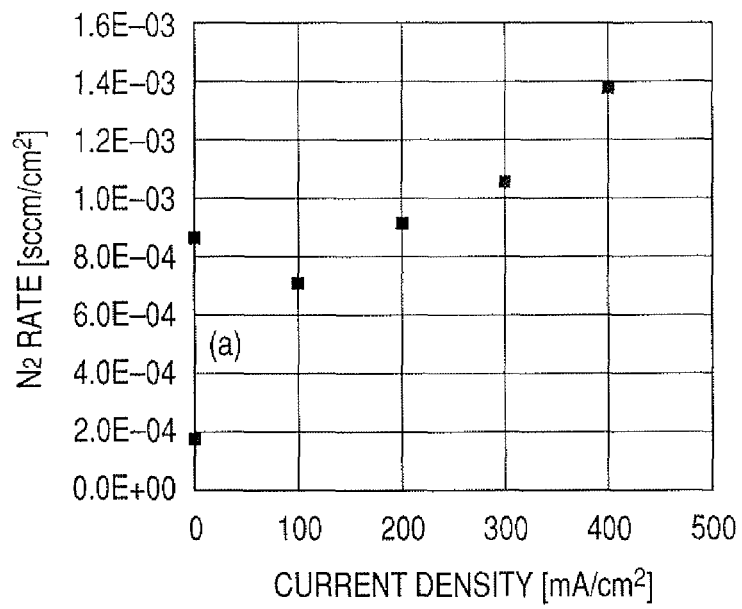
FIG. 10 is a graphical representation showing the relationship between the intrusion amount of nitrogen and the output current of a membrane electrode assembly of the fuel cell according to Embodiment 3 of the present invention.
FIG. 11 is a list of the characteristics of fuel cell stacks having different volumes of fuel supply space, volumes of buffer space, initial pressures in fuel supply space, and fuel supply pressures.

FIG. 1 is a schematic perspective view of a fuel cell of Embodiment 1; FIG. 2 is a schematic cross-sectional view of a fuel cell stack taken along dashed line 2-2 in FIG. 1; FIGS. 3A, 3B and 3C are schematic perspective views of a separator; and FIG. 4 is a schematic perspective view of a buffer space. FIG. 11 is a list of the characteristics of fuel cell stacks having different volumes of fuel supply space, volumes of buffer space, initial pressures in fuel supply space, and fuel supply pressures.

As shown in FIG. 1, a fuel cell 20 is assembled by detachably connecting a fuel cell stack 20A to a fuel tank 20B. In the fuel cell stack 20A, a plurality of fuel cell units 23 are stacked between a pair of end plates 21 and 22. The fuel tank 20B is filled with hydrogen gas as a gaseous fuel, and hydrogen gas adjusted to have a required pressure is supplied into the fuel cell stack 20A.

The end plate 21 is provided with an inlet 24 of the fuel supply spaces to which the fuel tank 20B is connected to supply hydrogen gas into the fuel cell stack 20A. In each of the membrane electrode assemblies (MEA) 25, catalyst layers supporting platinum fine particles are formed on the upper and lower surfaces of a solid polymer electrolyte membrane. The catalyst layer on the upper surface in FIG. 1 is an oxidizer electrode; and the catalyst layer on the lower surface is a fuel electrode. The plurality of membrane electrode assemblies 25 are stacked via separators 26.

As shown in FIG. 2, gas diffusion layers 23A and 23B are disposed between the membrane electrode assemblies 25 and the separators 26. The gas diffusion layers 23A and 23B are formed of a porous sheet material having properties to permeate reactants and also having electrical conductivity. Examples of materials preferably used in the gas diffusion layers 23A and 23B include carbon cloth and carbon paper.

Atmospheric oxygen intrudes via an oxidizer flow path 31 provided in each separator 26 into a fuel cell unit of each stage in a direction perpendicular to the drawing plane of FIG. 2, and diffused and supplied via the gas diffusion layers 23A to the entire upper surface of the membrane electrode assemblies 25.

Hydrogen gas is supplied via the inlet 24 of the fuel supply spaces into the supply-side main flow path 44 provided on the left side in the figure, branched from the supply-side main flow path 44, and distributed and supplied to the fuel flow paths 32 of the respective stages. The supply-side main flow path 44 is formed by superimposing the through-holes 33 provided in the respective separators 26. The fuel flow paths 32 of the respective stages join to a discharge-side main flow path 45 on the downstream side (the right side in the figure), and the discharge-side main flow path 45 is connected to the buffer space 42 provided on the end plate 22. The downstream side of the buffer space 42 is provided with an outlet 43 of the fuel flow path, and in this first embodiment, the fuel cell stack 20A is used in the state in which the outlet 43 of the fuel flow path is closed using a stop valve 51. Specifically, the fuel cell stack 20A of this first embodiment is a dead-ended fuel cell stack.

As shown in FIG. 3A, parallel channel-shaped oxidizer flow paths 31 are formed on the front surface (downside, in FIG. 3A) of the separator 26. As shown in FIG. 2, the oxidizer flow paths 31 supply atmospheric oxygen via the gas diffusion layers 23A to the oxidizer electrodes of the membrane electrode assemblies 25.

On the rear surface (upside, in FIG. 3A) of the separator 26, a switchback-shaped fuel flow path 32 is formed. As shown in FIG. 2, the fuel flow paths 32 supply hydrogen gas via the gas diffusion layers 23B to the fuel electrodes of the membrane electrode assemblies 25.

Further, on the end of the separator 26, a through-hole 33 for leading hydrogen gas supplied from the inlet 24 of the fuel supply spaces in FIG. 2 to the fuel cell unit 23 of each stage is provided. On the other end of the separator 26, a through-hole 34 for leading impurity gas that intruded into the fuel cell unit 23 of each stage to the buffer space 42 is provided.

As shown in FIG. 3B, on the front surface (downside, in FIG. 3B) of the separator 26a, which is provided in the uppermost portion of the fuel cell stack 20A in FIG. 2, parallel channel-shaped oxidizer flow paths 31 and a through-hole 33 for leading hydrogen gas to the fuel cell unit 23 of each stage are provided. However, there is provided neither fuel flow path on the rear surface nor through-hole to lead the impurity gas.

As shown in FIG. 3C, on the rear surface (upside, in FIG. 3C) of the separator 26b provided on the lowermost part of the fuel cell stack 20A in FIG. 2, a switchback-shaped fuel flow path 32 and a through-hole 34 for leading the impurity gas to the buffer space 42 are formed. However, there is provided neither oxidizer flow path on the back surface nor through-hole to lead hydrogen gas.

As shown in FIG. 4, a switchback-shaped buffer space 42 to store impurity gas which has drifted by the fuel cell units 23 (FIG. 2) is formed on the end plate 22. Since the buffer space 42 is switchback-shaped, the flow-path resistance is high, and it is difficult that the impurity gas stored in the buffer space 42 is diffused back to the fuel cell units 23. Furthermore, when the stop valve 51 connected to the fuel path outlet 43 is opened for purging, since the impurity gas is pushed out along the buffer space 42, it is difficult that the new hydrogen gas subsequently supplied is mixed with the impurity gas.

The volume V1 of the fuel supply spaces is the volume of the region raging from the inlet 24 of the fuel supply spaces to the discharge-side main flow path 45, specifically, the sum of the total volume of the fuel flow paths in the respective stages and the volume of the supply-side main flow path 44. The volume V2 of the buffer space is the volume of the buffer space 42 itself.

Incidentally, during operation, impurity gas of a concentration equivalent to the concentration in the buffer space 42 is also stored in the portion close to the buffer space of the discharge-side main flow path 45 (i.e., the lower portion of the discharge-side main flow path 45 in FIG. 2). However, this portion is merely a connecting flow path, and is different from the buffer space of the present invention. Furthermore, as shown in FIGS. 3A, 3B, and 3C, the volume of the through-hole 34 itself constituting the discharge-side main flow path 45 is also small.

When a fuel cell mounted device 50 is stopped, the fuel flow path 32 is maintained in the state such that the gas inside thereof is substituted by an inert gas, such as nitrogen, or the inside thereof is open to the atmosphere. Specifically, before the fuel cell stack 20A starts to generate electric power, the fuel flow path 32 is in the state filled with an inert gas or the atmosphere of an initial pressure of P1.

When the fuel cell stack 20A starts to generate electric power, hydrogen gas is supplied from the fuel tank 20B shown in FIG. 1 to the inlet 24 of the fuel supply spaces in the fuel cell stack 20A. The pressure P2 of the supplied hydrogen gas is adjusted by a regulator (not shown) provided on the fuel tank 20B side. The inlet 24 of the fuel supply spaces is connected to the fuel tank 20B via a coupler, valve or the like. The supply of hydrogen gas is started by connecting the fuel tank 20B to the inlet 24 of the fuel supply spaces with a coupler or the like, or by opening a valve provided at the inlet 24 of the fuel supply spaces.

In the fuel cell stack 20A according to this first embodiment, the volume of the fuel supply spaces was represented by V1, the volume of the buffer space was represented by V2, the initial pressure in the fuel supply spaces was represented by P1, and the fuel supply pressure was represented by P2. At this time, the volume of the buffer space V2 and the fuel supply pressure P2 were set so as to satisfy the relationship of P1/P2<V2/(V1+V2). By setting in this manner, substantially all the gas present in the fuel supply spaces when starting fuel supply is transferred into the buffer space.

As shown in Table 1 of FIG. 11, when the combination of the volume of the fuel supply spaces V1, the volume of the buffer space V2, the initial pressure in the fuel supply spaces P1, and the fuel supply pressure P2 is changed, the performance of the fuel cell stack 20A is changed. Here, the inside of the fuel path 32 before supplying the fuel was in the state filled with nitrogen gas of the atmospheric pressure. Therefore, the initial pressure in the fuel supply spaces was about 100 kPa. As the fuel, pure hydrogen gas is used, and the fuel supply pressure can be optionally set using the regulator. The inlet 24 of the fuel supply spaces is provided with a female coupler, and by connecting the female coupler to a male coupler provided at the outlet of the fuel tank 20B, hydrogen gas is supplied.

For comparison, three kinds of endplates 22 were prepared. In one of them, no buffer space 42 was formed; and in the other two, the buffer space 42 was formed, respectively, and the volume V2 of the buffer space was set to be 0.8 ml and 1.6 ml depending on a difference in the depth of the channels. The volumes V1 of the fuel supply spaces are values actually measured after assembling the fuel cell stack 20A. Specifically, nitrogen gas was introduced from the inlet 24 of the fuel supply spaces to obtain the values from the relationship between the amount of introduced nitrogen and the increase of pressure.

The performance of the fuel cell stack 20A was measured after the coupler of the fuel cell stack 20A had been connected to the coupler of the fuel tank 20B, by a current sweep method wherein the values of extracted current are varied from the minimum to the maximum at a constant sweep rate. The current values shown in the list of Table 1 are values when the average output voltage per fuel cell unit 23 in the fuel cell stack 20A lowers to 0.7 V.

In Sample Nos. 1 to 3, experiments were conducted by varying the volume V2 of the buffer space on the endplate 22. It is seen that the larger the volume of the buffer space 42 provided at the downstream of the fuel flow path 32, the more the performance of the fuel cell stack 20A is improved. In particular, the significant improvement of performance is confirmed in Sample No 3, which satisfies the relationship of $P1/P2 < V2/(V1+V2)$.

In Sample Nos. 4 to 6, experiments were conducted by varying the fuel supply pressure P2 using the same fuel cell stack 20A. It is seen that the higher the fuel supply pressure P2, the more the performance of the fuel cell stack 20A is improved. In particular, the significant improvement of performance is confirmed in Sample No 6, which satisfies the relationship of $P1/P2 < V2/(V1+V2)$.

As described above, the fuel cell 20 of this first embodiment can be activated and starts power generation without purging the fuel cell stack 20A filled with inert gas of the atmospheric pressure. When the fuel supply pressure P2 of twice the atmospheric pressure is used, if the inert gas in the fuel cell stack 20A is pushed into the volume V2 of the buffer space having the volume exceeding 100% of the volume of the fuel supply spaces, sufficient partial pressure of hydrogen gas can be secured in all the fuel flow paths 32. In order to push the inert gas in the fuel cell stack 20A into the volume V2 of the buffer space having the volume of 33% of the volume of the fuel supply spaces, if the fuel supply pressure P2 of four or more times the atmospheric pressure is used, sufficient partial pressure of hydrogen gas can be secured in substantially all the fuel flow paths 32.

Therefore, even if the fuel cell stack 20A is stored in the state filled with inert gas of the atmospheric pressure, power generation can be immediately started by flowing the fuel gas thereinto. Therefore, the fuel cell 20 can be started without the purging operation, the wasteful fuel consumption accompanying the purging operation can be avoided, and hydrogen gas in the fuel tank 20B can be effectively used. Therefore, since more electric power can be generated by the fuel tank 20B of the same volume, the fuel cell 20 having higher energy capacity can be provided.

MODIFICATION OF EMBODIMENT 1

Figure 5:
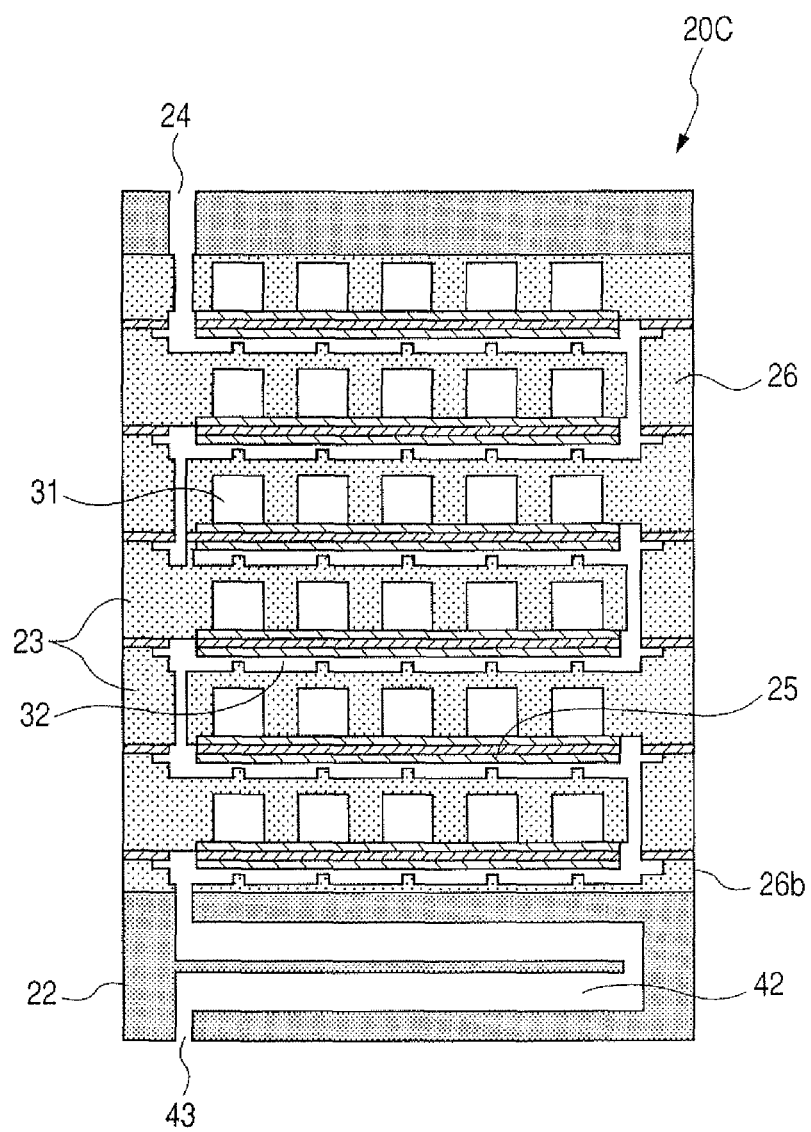
FIG. 5 is a schematic cross-sectional view of a configuration of a fuel cell stack of a serial pattern in a modification of Embodiment 1 of the present invention.
Figure 6:
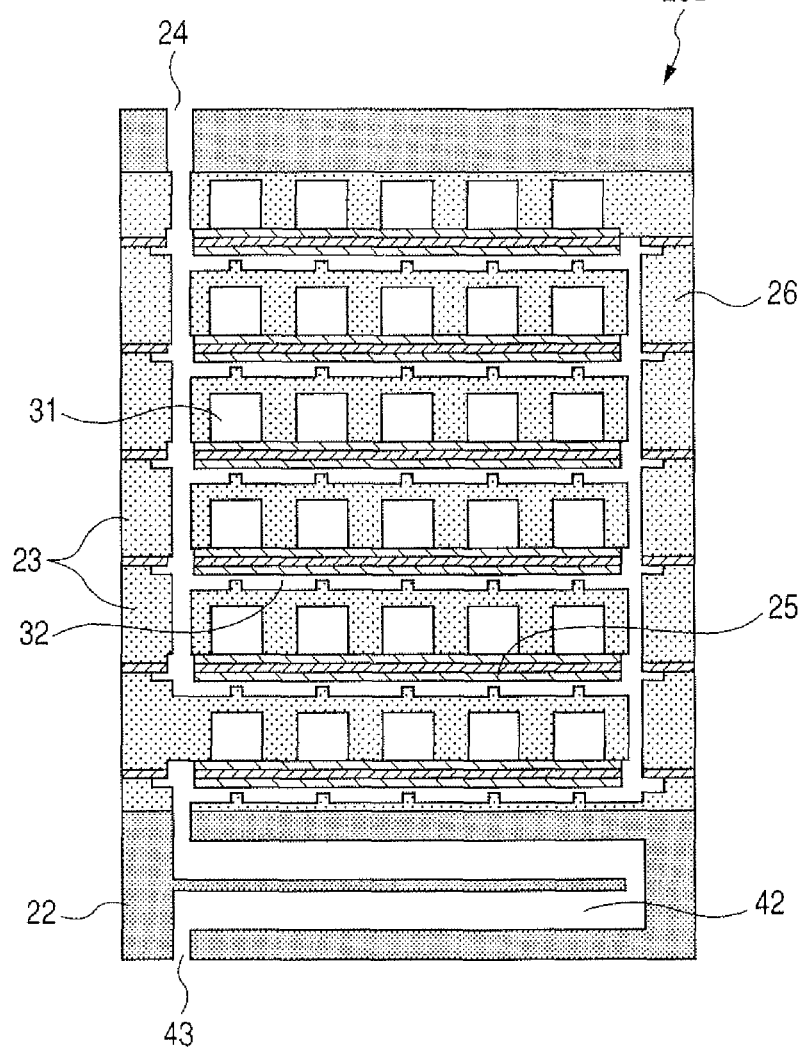
FIG. 6 is a schematic cross-sectional view of a configuration of a fuel cell stack of a cascade pattern in a modification of Embodiment 1 of the present invention.
Figure 7:
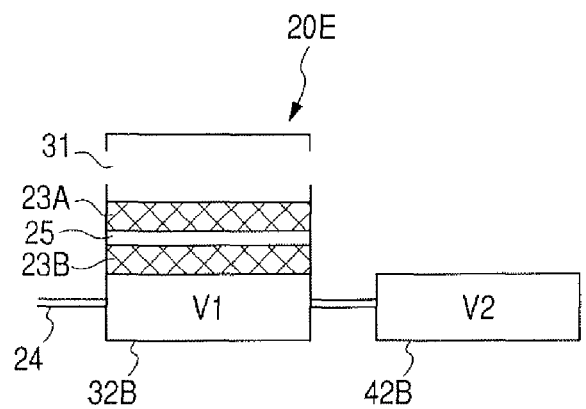
FIG. 7 is a schematic configuration diagram of a modification with an external buffer space.

FIG. 5 is a schematic cross-sectional view of a configuration of a fuel cell stack of a serial pattern, FIG. 6 is a schematic cross-sectional view of a configuration of a fuel cell stack of a cascade pattern, and FIG. 7 is a schematic configuration diagram of a modification with an external buffer space. In FIGS. 5 to 7, the elements which are common (functionally equivalent) to those of the fuel cell stack 20A shown in FIG. 2 are identified by like numerals and characters, and the detailed description thereof will be omitted.

The fuel cell stack 20A of Embodiment 1 has a parallel flow pattern in which the fuel flow paths 32 are in parallel and in the same direction shown in FIG. 2. However, also in the fuel cell stack 20C of a serial pattern in which fuel flow paths 32 are in series shown in FIG. 5, the same effects as in Embodiment 1 can be realized by providing the buffer space 42, and using a high fuel supply pressure P2 corresponding to the volume V2 of the buffer space.

Also by the fuel cell stack 20D of a cascade pattern in which fuel flow paths 32 are connected in a cascade such as shown in FIG. 6, the same effects as in Embodiment 1 can be realized by providing the buffer space 42, and using a high fuel supply pressure P2 corresponding to the volume V2 of the buffer space.

Specifically, the volume of the region including the fuel flow paths 32 located from the fuel inlet 24 to the most downstream of the fuel cell stacks 20C and 20D is the volume V1 of the fuel supply spaces, and the volume of the region which is more downstream thereof is the volume V2 of the buffer space. The fuel cell stack 20A of the parallel flow pattern has a plurality of fuel cell units 23 located at the most downstream.

Furthermore, in Embodiment 1, a recess is formed in the surface of the endplate 22 overlaid on the fuel cell stack 20A to provide the buffer space 42. However, as schematically shown in FIG. 7, the buffer space 42B can be provided by externally connecting to the downstream side of the fuel cell stack 20E.

Furthermore, besides the form in which a plurality of fuel cell units 23 are stacked as in Embodiment 1, a buffer space 42B can be connected to a downstream side of a fuel flow path 32B of a single fuel cell unit.

EMBODIMENT 2

Figure 8:
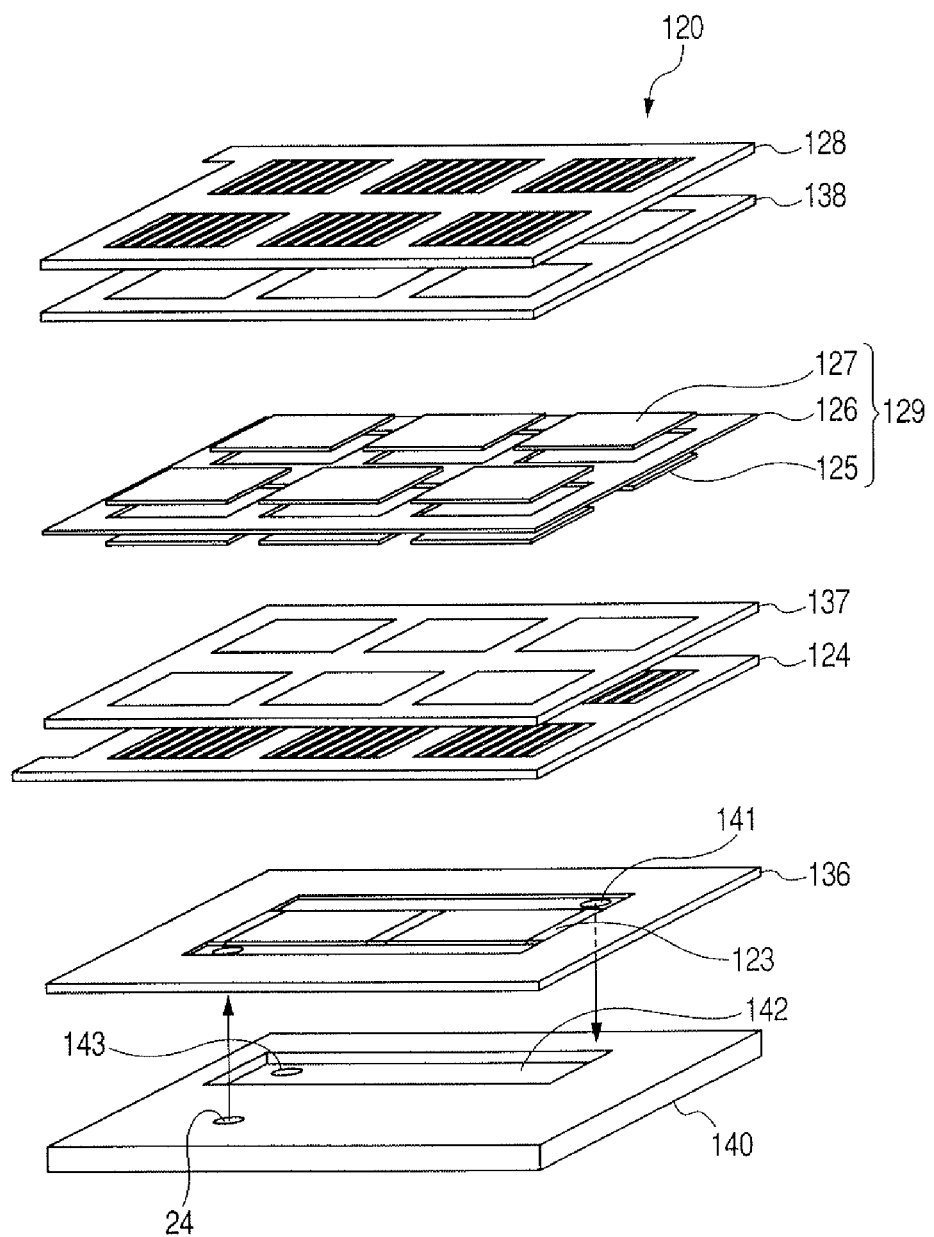
FIG. 8 is a schematic, exploded perspective view of the configuration of a fuel cell according to Embodiment 2 of the present invention.

FIG. 8 is a schematic, exploded perspective view of a fuel cell of Embodiment 2. As shown in FIG. 8, in the fuel cell 120 of this second embodiment, a plurality of fuel cell units 129 are arranged in plane on a common buffer substrate 140 having a buffer space 142 formed therein. The plurality of fuel cell units 129 are connected in parallel by a common fuel electrode collector 124 and a common oxygen electrode collector 128, whereby electric power is extracted in parallel. The fuel cell units 129 each allow a gas diffusion layer 125 to contact the lower surface of a membrane electrode assembly 126 having catalyst layers formed on the both surfaces of a polymer electrolyte membrane, and allow a gas diffusion layer 127 to contact the upper surface thereof.

The gas diffusion layers 125 and 127 are held in independent openings of a fuel electrode spacer 137 and an oxygen electrode spacer 138, respectively. The fuel electrode spacer 137 and the oxygen electrode spacer 138 are sandwiched between the fuel electrode collector 124 and the oxygen electrode collector 128 together with the fuel cell units 129 to thereby be assembled.

In the fuel electrode collector 124 and the oxygen electrode collector 128, a region of a conductive porous material is independently disposed for each of the fuel cell units 129. The supply of hydrogen gas to the fuel cell units 129 is performed via a flow path substrate 136 disposed on the lower surface of the fuel electrode collector 124. The space surrounded by the partition frames of the fuel electrode collector 124 and the fuel electrode spacer 137, the membrane electrode assembly 126, and the flow path substrate 136 is a fuel space sealed from the atmospheric air to hold the gas diffusion layer 125.

The gas diffusion layer 127 is held in the partition frame of the oxygen electrode spacer 138, and the surface thereof is open to the atmospheric air via the oxygen electrode collector 128. Since the fuel cell units 129 are arranged in a plane, the oxygen intake area and the water-vapor discharge area can be secured to be larger compared to those of the form of stacked fuel cell units.

In the flow path substrate 136, a plurality of branch flow paths 123 that lead hydrogen gas supplied from the fluid inlet 24 to two each of the fuel cell units 129 are formed. The branch flow paths 123 increase the flow-path resistance in portions being in contact with the fuel electrode collector 124 to prevent the passing-by phenomenon of hydrogen gas.

A buffer substrate 140 is disposed under the flow path substrate 136. In the buffer substrate 140 a recess for the buffer space 142 is formed, and the upper surface of the buffer space 142 is sealed by the flow path substrate 136. A plurality of branch flow paths 123 that has joined together on the flow path substrate 136 are communicated with the buffer space 142 via the through-hole 141, and in the buffer space 142 on the opposite side of the through-hole 141, a fluid outlet 143 is formed.

To the fluid outlet 143, a stop valve (not shown) is connected in the same manner as in Embodiment 1, and the fuel cell 120 of Embodiment 2 is a dead-ended fuel cell which is operated with the stop valve being closed as is the case with the fuel cell stack 20A of Embodiment 1.

The volume of the fuel supply spaces including the branch flow paths 123 was represented by V1, the volume of the buffer space 142 was represented by V2, the initial pressure of the fuel supply spaces was represented by P1, and the fuel supply pressure was represented by P2. At this time, the volume V2 of the buffer space and the fuel supply pressure P2 were set so as to satisfy the relationship of $P1/P2 < V2/(V1+V2)$.

The fuel cell 120 is stored in a state in which the fuel supply spaces including the branch flow paths 123 is filled with an inert gas of the atmospheric pressure. When power generation is started, in the same manner as in Embodiment 1, hydrogen gas is supplied from the fluid inlet 24 at a fuel supply pressure higher than the atmospheric pressure to transfer the inert gas in the fuel supply spaces including the branch flow paths 123 into the buffer space 142.

In the catalyst layer of the membrane electrode assembly 126 adjoining the gas diffusion layer 125, hydrogen gas is decomposed into hydrogen atoms and ionized by a catalytic reaction, and the hydrogen ions are supplied to the polymer electrolyte membrane. In the catalyst layer of the membrane electrode assembly 126 adjoining the gas diffusion layer 127, oxygen reacts with hydrogen ions that have passed through the polymer electrolyte membrane to generate water molecules by a catalytic reaction. Electrons extracted when the hydrogen atoms are ionized reach the catalyst layer of the membrane electrode assembly 126 adjoining the gas diffusion layer 127 through the fuel electrode collector 124, external circuits (not shown), and the oxygen electrode collector 128.

EMBODIMENT 3

Figure 9:
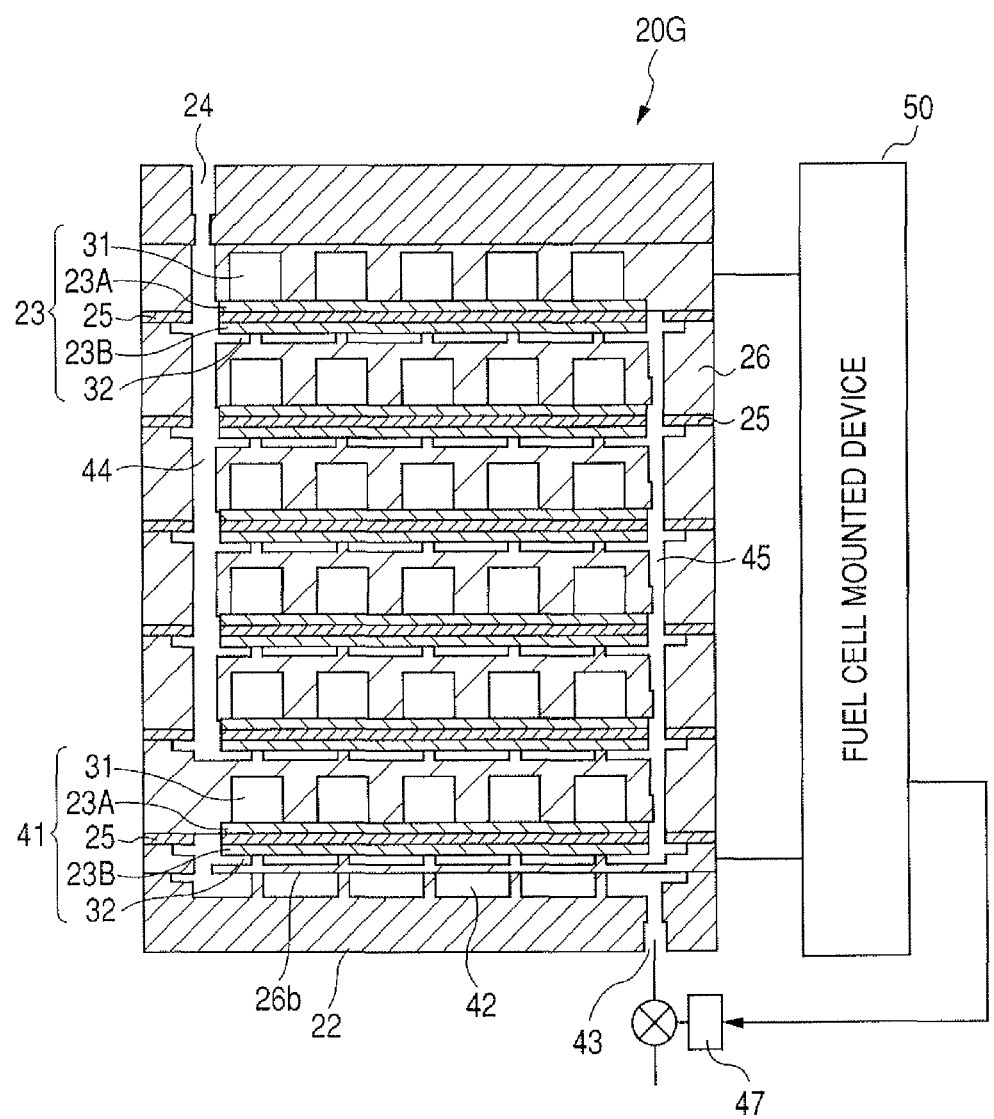
FIG. 9 is a schematic cross-sectional view showing the configuration of a fuel cell according to Embodiment 3 of the present invention.

FIG. 9 is a schematic cross-sectional view illustrating the configuration of a fuel cell according to Embodiment 3; FIG. 12 is a table for comparing the discharge amounts of hydrogen gas in the presence/absence of buffer space; and FIG. 10 is a graphical representation showing the relationship between the nitrogen intrusion amount and the output current of a membrane electrode assembly of the fuel cell according to Embodiment 3. Since the fuel cell stack 20G is constituted in the same manner as the fuel cell stack 20G of Embodiment 1 with the exception that fuel cell units are connected in a cascade pattern, the members common to those in FIG. 2 are identified by like numerals and characters, and the detailed description thereof will be omitted.

The fuel cell stack 20G of this third embodiment is connected to the fuel tank 20B shown in FIG. 1 to constitute a fuel cell. As shown in FIG. 9, a purge valve 47 is connected to the outlet 43 of the fuel flow path formed on the downstream side of the buffer space 42. Although the purge valve 47 is normally in the closed state, it is opened in a predetermined timing to purge impurity gas concentrated and stored in the buffer space 42 into the atmosphere. The opening/closing operation of the purge valve 47 is controlled by an electric circuit provided in the fuel cell carrying equipment 50.

As the method of supplying hydrogen gas used in the fuel cell stack 20G, on-site fuel producing, supply of stored fuel, or the like can be optionally selected. In this third embodiment, a fuel tank 20B having a hydrogen storage alloy is used. Hydrogen gas discharged from the fuel tank 20B is adjusted to have a desired pressure by a built-in regulator, and then supplied to the fuel cell stack 20G. The pressure of fuel supplied to the fuel cell stack 20G is selected depending on the conductance of the fuel flow path 32, the thickness of the polymer electrolyte membrane used in the membrane electrode assembly 25, or the like. The fuel tank 20B is filled with about 5 liters of hydrogen, which is supplied to the fuel cell stack 20G after reducing the pressure to 200 kPa (about 2 atm) by the regulator.

The fuel cell stack has a fuel flow path 32 configuration of a cascade pattern. Specifically, hydrogen gas introduced from the fuel inlet 24 is supplied in parallel to a plurality (N−1) of fuel cell units 23. At the downstream of N−1 fuel cell units 23, the fuel flow paths 32 are joined to the discharge-side main flow path 45, and the joined hydrogen gas is supplied to the fuel cell units 41 at the most downstream. Here, N is the total number of the fuel cell units 23 and 41 in the fuel cell stack 20G. In this third embodiment, the fuel cell stack 20G of N=12 (partly not shown) is constituted. At this time, the total area of the membrane electrode assembly 25 in the fuel cell stack 20G is about 30 $cm^2$.

A buffer space 42 is provided at the downstream of the fuel flow paths 32 in the fuel cell unit 41. At the further downstream of the buffer space 42, a purge valve 47 is installed. Specifically, also in this third embodiment, a dead-ended mode operation is conducted. Since the dead-ended fuel cell stack 20G requires no piping or pump for fuel circulation, it has a configuration suitable for the size reduction of the fuel cell 20. Furthermore, in comparison to the flow-type fuel cell that does not circulate hydrogen gas, since the configuration does not discharge unutilized hydrogen gas, it is considered to be suitable for the effective utilization of the fuel.

By the above-described configuration of the fuel flow paths 32, the impurity gas is concentrated and stored in the buffer space 42. By the hydrogen gas flow formed in the fuel cell units 23, the concentration of the impurity gas in the fuel cell units 23 is higher on the more downstream side. Hydrogen gas having impurity gas concentration increased by the fuel cell units 23 flows through the discharge-side main flow path 45 into the lowermost fuel cell unit 41.

Also in the fuel cell unit 41, impurity gas concentration becomes higher in the more downstream side. In the buffer space 42 whose impurity gas concentration is balanced by the impurity gas concentration at the outlet of the fuel cell unit 41, impurity gas of a concentration significantly higher than the concentration in the discharge-side main flow path 45 is stored. The impurity gas in the buffer space 42 is driven by a concentration difference to be diffused to the upstream side of the fuel flow path 32. However, the hydrogen gas flowing in the fuel flow path 32 toward the downstream side interferes with the diffusion and allows the impurity gas to drift to the downstream side to thereby maintain the high concentration of the impurity gas in the buffer space 42.

In this third embodiment, the volume of the buffer space 42 was 0.6 ml. For comparison, a fuel cell stack of the same configuration not provided with the buffer space 42 (Comparative Example) was also prepared.

Next, the intrusion rate (intrusion amount per unit time) of the impurity gas will be described. This third embodiment is an open-air fuel cell 20 in which the oxidizer electrode is open to the atmosphere. Therefore, the major component of the impurity gas intruding into the fuel flow path 32 is nitrogen gas contained in the air. In the fuel cell 20, it has been confirmed that the nitrogen gas intrudes into the fuel flow path 32 mainly via the membrane electrode assembly 25 from the oxidizer electrode.

FIG. 10 shows an example of the measurement results of nitrogen gas intrusion rate through the membrane electrode assembly 25 used in this third embodiment. The abscissa indicates generated output current densities, and the ordinate indicates nitrogen gas intrusion rates per unit area of the membrane electrode assembly 25. When the output current density during power generation is high, the nitrogen gas intrusion rate through the membrane electrode assembly 25 is also increased. The intrusion rate of nitrogen gas also differs depending on the environmental atmosphere in which the membrane electrode assembly 25 is placed. Depending on conditions, even when power generation is not performed, the intrusion rate of nitrogen gas may differ by about one digit as indicated by (a) in FIG. 10. Therefore, it is preferable to see the intrusion rate of nitrogen gas in consideration of the use environment and operating current of the fuel cell 20.

In this third embodiment, it is assumed that the fuel cell is used at an operating current density of 200 mA/cm$^2$ so as to meet the specification of the fuel cell mounted device 50. It is seen from FIG. 10 that the intrusion rate of nitrogen gas per unit area of the membrane electrode assembly 25 is $1.7 \times 10^{-5}$ ml/sec·cm$^2$ ($1 \times 10^{-3}$ sccm/cm$^2$); and from the total area of the membrane electrode assembly 25 of 30 cm$^3$, the rate v of nitrogen gas intrusion into the fuel flow path 32 is $5 \times 10^{-4}$ ml/sec (0.03 sccm).

In a fuel cell having a different configuration, there are cases where the species of intruding impurity gas, or the major site of intrusion may differ. However, although the intrusion rate of the impurity gas into the fuel flow path 32 differs depending on the use environment, operating conditions, and the configuration of the fuel cell, it can be measured or estimated.

In the fuel cell stack 20G of this third embodiment, when the volume of the buffer space is represented by V, the nitrogen intrusion rate is represented by v, the purge interval is represented by T, the fuel supply pressure is represented by P2, and the atmospheric pressure is represented by P0, the control to be $T \times v \times (P0/P2) < V$ is performed by the fuel cell amounted device 50.

In this third embodiment, by providing the buffer space 42 at the downstream of the fuel flow path 32, the interval T of purging during the operation of the fuel cell 20 can be arbitrarily set. The results of applying the above-described arithmetic expression to the dimensional configuration of this third embodiment are listed in Table 2 of FIG. 12. The purge interval T in this third embodiment is calculated as 44 minutes or less, and that in the fuel cell of Comparative Example in which the buffer space 42 is not provided is calculated as 3.4 minutes. Incidentally, when the purge interval is calculated, the allowable concentration of the impurity gas in the fuel flow path 32 is assumed to be 10%.

During the purge operation, the impurity gas is removed from the fuel flow path 32, and at the same time, a certain amount of hydrogen gas is discharged to the atmosphere. Therefore, in the fuel cell of Comparative Example which requires frequent purge operations, the effective utilization of the fuel becomes difficult.

The open/close operation of the purge valve 47 is determined by, for example, the configuration of the fuel flow path 32 in the fuel cell stack 20G, the configuration of the purge valve 47 and the like. In the purging operation in the third embodiment, the operation in which the purge valve 47 is opened for 0.1 second and then closed is performed three times at one-second intervals. In this series of purging operations, the volume of hydrogen gas discharged through the purge valve 47 to the atmosphere is about 10 ml.

As shown in Table 2, in the third embodiment, such purging operations are performed at 30-minute intervals. Thereby, stable outputs are obtained from the fuel cell 20. Using one fuel tank 20B, the fuel cell 20 can be continuously used for about two hours. In this continuous use, the four purging operations in total are performed, and about 40 ml of hydrogen is consumed by the purging operations.

On the other hand, in the fuel cell not provided with the buffer space 42, a purging operation is required every three minutes. This is because the volume of the fuel flow path 32 in the fuel cell unit 41 on the most downstream side is about 0.5 ml, and the influence of the storage of nitrogen gas on the performance of the fuel cell stack 20G is larger than that of Embodiment 3. Thereby, in two-hour operation in the output state similar to Embodiment 3, 40 purging operations are performed, and the amount of hydrogen gas discharged to the atmosphere is 400 ml. Actually, due to the wasteful consumption of hydrogen gas, one fuel tank 20B enables the continuous use of the fuel cell 20 for only about 1.8 hours.

Thus, in the fuel cell stack 20G of Embodiment 3, the adverse affect of impurity gas in the fuel flow path 32 during the operation of the fuel cell 20 can be suppressed. Therefore, since the frequency of purging operations can be reduced, and the consumption of hydrogen gas involved with purging operations can be suppressed, the fuel can be utilized effectively. Therefore, since power generation can be performed for a longer period of time by using the fuel tank 20B having the same volume, a fuel cell 20 having a higher energy capacity can be provided.

According to Embodiment 3, by providing the buffer space 42 at the downstream of the fuel flow path 32 in the fuel cell stack 20G, the following effects can be obtained. That is, the adverse affect of the impurity gas that may be present in the fuel flow path 32 on the power generation of the fuel cell stack 20G can be suppressed. Thereby, during the operation of the fuel cell 20, purging operation can be eliminated, or the frequency of purging operations can be reduced.

Therefore, the amount of hydrogen gas discharged to the atmosphere together with the impurity gas in every purging operation can be reduced. Furthermore, electric power consumed by the purge valve 47 or the like during purging operations can be saved. As a result, the fuel can be efficiently utilized, and a fuel cell 20 having a higher energy capacity can be provided.

In Embodiment 3, the example in which the fuel flow paths 31 in the fuel cell stack 20G were connected in a cascade pattern was described. However, also in the case of the connection pattern of the parallel pattern shown in FIG. 2, or by the serial pattern shown in FIG. 5, an embodiment can also be realized in which a purge valve 47 is connected to a fuel cell stack and purging operation is controlled by the fuel cell mounted device 50.

Further, also in the embodiment shown in FIG. 7 in which the buffer space 42B is externally connected to the downstream side of the fuel cell stack 20E, an embodiment can be realized in which a purge valve 47 is connected on the downstream side of the buffer space 42B.

This application claims priority from Japanese Patent Application No. 2006-059180 filed Mar. 6, 2006, which is hereby incorporated by reference herein.

The invention claimed is:

1. A fuel cell stack having stacked fuel cells and an end plate adjacent to a last of the stacked fuel cells, the fuel cell stack further comprising:
   a solid electrolyte layer;
   a fuel supply space into which a gaseous fuel is supplied, formed on one surface side of the solid electrolyte layer; and
   a buffer space for transferring and storing impurity gas that intruded into the fuel supply space, formed downstream of and in communication with the fuel supply space,
   wherein the buffer space is provided in the end plate, with one end of the buffer space being in communication with the fuel supply space and another end of the buffer space capable of being closed, wherein
   an open/close valve opened when discharging the impurity gas in the buffer space is connected to the buffer space at a side opposite to a side communicated with the fuel supply space, and
   the buffer space is constituted of a flow path structure which is longer than a linear distance from a position communicated with the fuel supply space to the open/close valve.

2. The fuel cell according to claim 1, comprising the fuel supply space in plurality, wherein at least a part of the plurality of fuel supply spaces are communicated in series, and the buffer space is in communication with a downstream side of the fuel supply space located on a most downstream side of fuel supply.

3. The fuel cell according to claim 1, wherein a volume of the buffer space is larger than a volume of a space ranging from an inlet of the buffer space to an outlet of the fuel supply space communicated with the buffer space, and an area of a cross section perpendicular to a flow of the impurity gas of the buffer space is larger than a cross-sectional area of a flow path through which the buffer space is communicated with the fuel supply space.

4. The fuel cell according to claim 1, wherein the fuel supply space communicated with the buffer space is constituted of a flow path structure ranging from a fuel supply side to a side communicated with the buffer space and is not communicated in parallel with another fuel supply space.

5. The fuel cell according to claim 2, which comprises the fuel supply space in plurality and is of a cascade system in which the fuel supply spaces are connected in series such that the number of fuel supply spaces connected in parallel to each other is gradually decreased toward a downstream side.

6. The fuel cell according to claim 1, wherein a plurality of fuel supply spaces are formed so as to be parallel to each other, and the buffer space is a recess formed in a plate-shaped member that is parallel to the fuel supply spaces.

7. The fuel cell according to claim 1, comprising a plurality of fuel supply spaces, wherein when a total volume of the fuel supply spaces is represented by V1, a volume of the buffer space is represented by V2, a pressure of the fuel supply spaces before fuel supply is represented by P1, and a pressure of the fuel supply spaces during fuel supply is represented by P2, a relationship of $P1/P2 < V2/(V1+V2)$ is established.

8. The fuel cell according to claim 1, further comprising a fuel tank that supplies the gaseous fuel into the fuel supply space filled with an inert gas or ambient air at a fuel supply pressure higher than a pressure of the fuel supply space before starting power generation to thereby transfer the inert gas or ambient air in the fuel supply space to the buffer space without being accompanied with a purge operation.

9. A fuel cell apparatus comprising the fuel cell set forth in claim 1 and a control unit for opening the open/close valve at given time intervals to discharge the impurity gas in the buffer space, wherein when the time interval is represented by T, the intrusion amount per unit time of nitrogen gas with respect to a total volume of a plurality of the fuel supply spaces communicated with each other is represented by v, the volume of the buffer space is represented by V2, the fuel supply pressure is represented by P2, and the atmospheric pressure is represented by P0, the relation of $T < (V2 \times P2)/(v \times P0)$ is established.

10. A method of operating a fuel cell using the fuel cell set forth in claim 7 comprising:
   filling and storing an inert gas or ambient air in the fuel supply space; and
   when starting power generation, supplying the gaseous fuel into the fuel supply spaces at a fuel supply pressure higher than a pressure in the fuel supply space before the fuel supply to thereby transfer the inert gas or ambient air in the fuel supply space to the buffer space.

11. A method of operating a fuel cell using the fuel cell set forth in claim 1 comprising:
   when the intrusion amount per unit time of nitrogen gas with respect to a total volume of a plurality of the fuel supply spaces communicated with each other is represented by v, the volume of the buffer space is represented by V2, the time interval to open the open/close valve is represented by T, the fuel supply pressure is represented by P2, and the atmospheric pressure is represented by P0, opening the open/close valve at time intervals of T determined by the equation of $T < (V2 \times P2)/(v \times P0)$ to discharge the impurity gas in the buffer space.

* * * * *